United States Patent
Nalukurthy et al.

(10) Patent No.: US 11,935,391 B2
(45) Date of Patent: Mar. 19, 2024

(54) METHODS AND SYSTEMS FOR COMMISSION, INSPECTION, AND MAINTENANCE OF A CONNECTED FIRE ALARM SYSTEM

(71) Applicant: Honeywell International Inc., Charlotte, NC (US)

(72) Inventors: Rajesh Babu Nalukurthy, Bangalore (IN); Jayaprakash Meruva, Bangalore (IN); Siva Sankar Mathuraju, Bangalore (IN); Simon Foulkes, Oakham (GB); Sameer Agrawal, Weddington, NC (US); Vipindas E K, Kannur (IN)

(73) Assignee: Honeywell International Inc., Charlotte, NC (US)

( * ) Notice: Subject to any disclaimer, the term of this patent is extended or adjusted under 35 U.S.C. 154(b) by 336 days.

(21) Appl. No.: 17/308,108

(22) Filed: May 5, 2021

(65) Prior Publication Data
US 2021/0350692 A1 Nov. 11, 2021

Related U.S. Application Data

(60) Provisional application No. 63/020,287, filed on May 5, 2020.

(51) Int. Cl.
*G06F 16/245* (2019.01)
*G06F 16/248* (2019.01)
(Continued)

(52) U.S. Cl.
CPC ........... *G08B 29/12* (2013.01); *G06F 16/245* (2019.01); *G06F 16/248* (2019.01); *G08B 5/36* (2013.01); *G08B 17/00* (2013.01); *H04W 88/02* (2013.01)

(58) Field of Classification Search
CPC ..... G06F 16/245; G06F 16/248; H04W 88/02
See application file for complete search history.

(56) References Cited

U.S. PATENT DOCUMENTS 9,552,720 B2   1/2017   Moffa
9,905,115 B2   2/2018   Venkatesh et al.
(Continued)

OTHER PUBLICATIONS

Extended European Search Report for related European Application No. 21172137.8, dated Sep. 30, 2021 (9 pgs).

*Primary Examiner* — Truong V Vo
(74) *Attorney, Agent, or Firm* — Brooks, Cameron & Huebsch, PLLC

(57) ABSTRACT

Fire alarm system device identification methods and systems are described herein. One fire alarm system, includes a gateway connected to a system control panel for allowing mobile device access to the system, a mobile device connected to the control panel, a fire alarm system control application on the mobile device, wherein the fire alarm control system application gains access to the control panel via the gateway, a search utility in the fire alarm control system application for identifying a particular fire alarm system device that is in a specific condition or location, and a database accessible via the fire alarm control system application wherein location and condition information about the plurality of fire alarm system devices is located, such that the search utility can search the database and identify the particular fire alarm system device from the other of the plurality of fire alarm system devices.

20 Claims, 5 Drawing Sheets

(51) Int. Cl.
 *G08B 5/36* (2006.01)
 *G08B 29/12* (2006.01)
 G08B 17/00 (2006.01)
 H04W 88/02 (2009.01)

(56) References Cited

U.S. PATENT DOCUMENTS

| | | |
|---|---|---|
| 2005/0280527 A1 | 12/2005 | Farley |
| 2015/0348399 A1 | 12/2015 | Cree et al. |
| 2016/0007179 A1 | 1/2016 | Kim |
| 2017/0092113 A1 | 3/2017 | Moffa |
| 2018/0122221 A1 | 5/2018 | Norton et al. |
| 2020/0327202 A1* | 10/2020 | Tran ........................ G06F 30/00 |

* cited by examiner

METHODS AND SYSTEMS FOR COMMISSION, INSPECTION, AND MAINTENANCE OF A CONNECTED FIRE ALARM SYSTEM

PRIORITY INFORMATION

This Application claims priority to U.S. Provisional Application No. 63/020,287, filed May 5, 2020, the contents of which are incorporated herein by reference.

TECHNICAL FIELD

The present disclosure relates to methods and systems for commission, inspection, and maintenance of a connected fire alarm system.

BACKGROUND

Traditional fire alarm systems require highly trained, skilled technicians in order to commission, inspect, and maintain them. One of the major challenges engineered systems distributors (ESDs) for fire alarm systems have is to maintain their number of skilled technicians or to keep the technicians that are highly knowledgeable about particular sites available for sites that they know well.

Currently many ESDs cannot take on more sites because they will not be able to afford to hire or keep on costly engineers for commissioning and inspection work, for example, to clean some devices that have become dirty in a building, ESDs need trained technicians who are well informed about the layout, equipment, and service history of a specific a site. Typically, the ESD does not want to send a technician that is not informed about the system utilized by the building and the building owner would like the technician most knowledgeable about their site working at their site.

Accordingly, ESDs attempt to send the same technician to the same building over and over again to build their knowledge base about that particular site, however, oftentimes that technician may be busy at another client. Without knowledge of the system layout, equipment, and maintenance history, a different technician can spend substantially longer at the building because they do not know the location of the devices of the system, may not know what devices need service, and may not know what service is to be provided.

DETAILED DESCRIPTION

Figure 1:
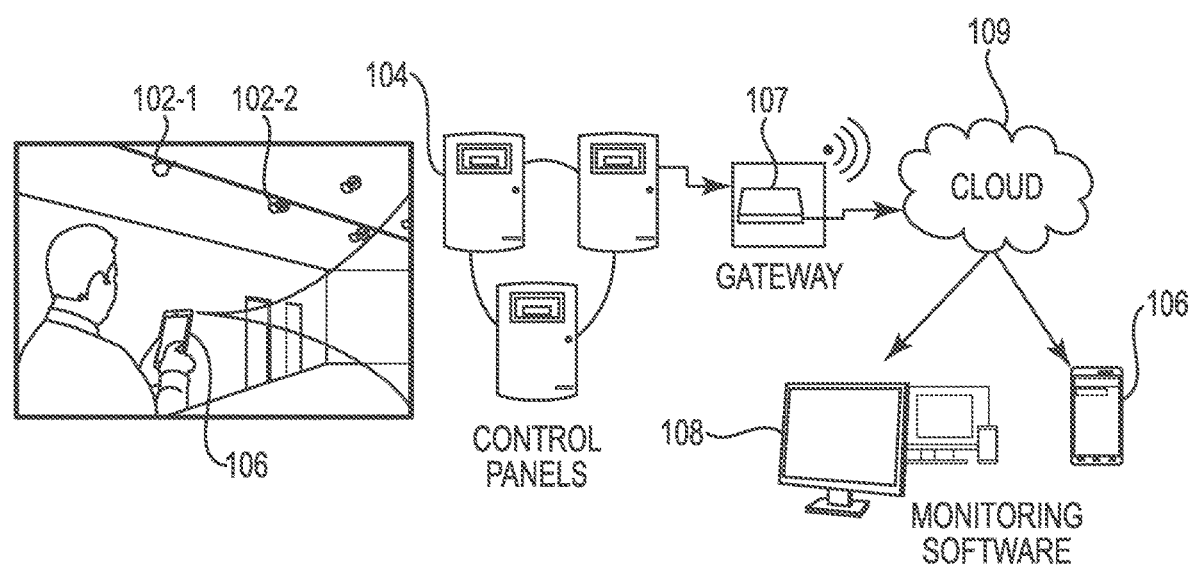
FIG. 1 illustrates a system for commission, inspection, and maintenance of a connected fire alarm system according to an embodiment of the present disclosure.

As discussed above, systems and methods for the commission, inspection, and maintenance of a connected fire alarm system are described herein. The concepts disclosed herein overcome the issues discussed above.

For example, in one embodiment, the fire alarm system includes a gateway connected to a system control panel for allowing mobile device access to the system, a mobile device connected to the control panel, a fire alarm system control application (monitoring application) installed on the mobile device, wherein the fire alarm control system application gains access to the control panel via the gateway. The fire alarm control system application includes a search utility for identifying a particular fire alarm system device that is in a specific condition or location, and a database accessible via the fire alarm control system application wherein location and condition information about the plurality of fire alarm system devices is located, such that the search utility can search the database and identify the particular fire alarm system device from the other of the plurality of fire alarm system devices.

As this information is provided to the mobile device, a technician can take the information with them as they move toward the location of the particular fire alarm system device. The system may also use the information to guide the technician to the particular fire alarm system device in a number of ways, as discussed herein.

In the following detailed description, reference is made to the accompanying drawings that form a part hereof. The drawings show, by way of illustration, how one or more embodiments of the disclosure may be practiced.

These embodiments are described in sufficient detail to enable those of ordinary skill in the art to practice one or more embodiments of this disclosure. It is to be understood that other embodiments may be utilized and that process, computerized, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 106 may reference element "06" in FIG. 1, and a similar element may be referenced as 206 in FIG. 2.

As used herein, "a" or "a number of" something can refer to one or more such things. For example, "a number of devices" can refer to one or more devices. As used herein, "a plurality of" means two or more things.

FIG. 1 illustrates a system for commission, inspection, and maintenance of a connected fire alarm system according to an embodiment of the present disclosure. FIG. 1 illustrates a system having monitoring software (fire alarm system control application) on a remote computing device 108 and a mobile device 106, communicating via a wide area network (e.g., cloud) 109, with a number of control panels 104, and a number of fire alarm system devices 102-1, 102-2.

A gateway 107 is installed at the building being monitored by the fire alarm system to facilitate the communication between the monitoring software on remote devices 106 and 108 and the control panels 104.

The one or more control panels 104 include a database therein that contains data about each fire alarm system device. Any suitable data can be contained therein. Examples of suitable data include: device address, device label, location information, make, model, service history, commission date, maintenance schedule items list, suggested maintenance timeframe information, historical service interval time periods, zone information, group information, and loop information.

As used herein the term zone means a number of fire alarm system devices that are located in a particular area of the building (e.g., a zone can be all devices in a conference room or the west wing of a floor of a building). A building may have a plurality of zones.

As used herein the term group means a number of fire alarm system devices that have a common characteristic and are grouped together by the technician (e.g., a group can be all devices of a particular make/model, devices being of a certain age, or devices having a particular functionality in common). A building may have a plurality of groups.

As used herein the term loop means a number of fire alarm system devices that are part of a sub-system of the overall system of a building. A building may have a plurality of loops each comprised of a different set of fire alarm system devices.

Location information can be any information that can be used to identify the location of a particular fire alarm system device. Examples of location information include: what floor a fire alarm system device is located on, a particular area of the building (e.g., west wing), or a particular room (e.g., conference room).

Service history information can be any information that can be useful to a technician regarding the service history of a particular fire alarm system device. Examples of service history information include: commission date, date of last service, type of service performed, technician notes on the condition of the fire alarm system device at the time of the last service, and emerging problems with the fire alarm system device.

As used herein a specific condition can include membership in a group of devices having a common maintenance condition, as discussed herein. For example, it may be advantageous to work on devices of the same group at the same time or to confirm that devices that should be part of a group are all members of that group. It may also be helpful to work on all devices having a common maintenance condition at the same time (e.g., device cleaning may require the same tools and materials, so the technician can quickly move from one device to the next if they all require that same service). This may be beneficial, for example, to identify and group all devices that were commissioned on a certain date and may need replacement.

A specific location can be a location in a group of devices at a particular physical location, within a particular floor, or within a particular loop. In some embodiments the search utility can identify fire alarm system devices that have a common specific location and/or have a common specific condition. This may be beneficial, for example, in identifying whether all devices in the conference room are members of the group labeled "Conf Room".

Additionally, the remote computing device 108 can be beneficial, for example, if a technician that is knowledgeable about the building is unable to visit the building. In such instances, a less knowledgeable technician may be on-site, but the more knowledgeable technician can access the control panels and assist the less knowledgeable technician from a remote location.

The above system arrangement allows the system to provide several unique functionalities. For example, the system has the ability to search for a specific device on a floor of the building through a process such as the following.

The technician comes to building, connects a gateway to a system control panel. Once the gateway is operational, allowing access by the technician's mobile device to the control panel of the fire alarm system of the building, the technician opens a mobile monitoring application on the mobile device and gets access to the system control panel via the gateway. The mobile monitoring application includes a search utility that allows the technician to search for one or more devices that are in a specific condition and/or location.

The technician can, then, command the one or more particular fire alarm system devices to respond by activating a physical identification signal, from an indicator located on the fire alarm system device, in a specific state. Any suitable state can be utilized. Some suitable states include: a certain color of light, a pattern of light pulses, a combination of alternating colors, etc.

The technician then walks around the floor, looking at the indicators (e.g., a visual indicator such as a particular colored light or pattern of light pulses) on the fire alarm system devices and is quickly able to identify and access to the one or more fire alarm system devices indicating the specific condition by locating the one or more fire alarm system devices with an indicator exhibiting the specific state. Such a feature can save a technician considerable time and allow the task to be accomplished by one technician.

Another unique functionality provided by such a system is the ability to securely search for a group of devices that are potentially due for maintenance or replacement in the near future. This can be accomplished, for instance, by reviewing the service history of each particular fire alarm system device identified, by reviewing device maintenance levels, and/or consulting general service maintenance guidelines for a particular fire alarm system device model to identify suggested maintenance timeframe information, for example.

For instance, smoke detectors can go into different maintenance levels like: low chamber value, maintenance alert, and maintenance urgent and such maintenance level information can be used to identify a fire alarm system device in need of a particular type of service. In such an embodiment, fire alarm system devices exhibiting such levels can be grouped and presented to the technician, via the mobile device, such that the technician can perform appropriate service to all fire alarm system devices of a particular level.

In another example, the technician can come to the building and search for fire alarm system devices with obscuration levels above a threshold (OBSCURATION (% PER FOOT)) higher than X %. The technician receives a list of the fire alarm system devices meeting such criteria on the technician's mobile device.

In this example, in the list the technician receives, the technician realizes that there are Y number of devices in first floor, Z number of devices in second floor, and so on. The technician then moves to the first floor and commands all of the Y number of fire alarm system devices on the list that are on the first floor, using the technician's mobile device, to signal the technician by initiating a particular physical identification signal on the fire alarm system devices. The technician can then walk around the floor and identify the fire alarm system devices that responded to this command based on them exhibiting the physical identification signal.

The technician, then, performs the required maintenance/replacement, and moves to the next device that is providing the specific indication (physical identification signal). The system can then update that the fire alarm system device is returning to an in-service state and informs the technician on the mobile device.

In this manner, without much understanding about the location of the fire alarm system devices in the building, the technician quickly completes this maintenance work and can move on to the next customer site.

It should be noted that each fire alarm system device can be placed in-service and out-of-service independently by the technician via the monitoring application on the mobile device. This allows for less devices being out-of-service during the maintenance process which reduces risk and liability of a fire starting during the maintenance period when devices are out-of-service.

Another functionality of the system described above is the ability to quickly locate the fire alarm system devices having a peak value. A peak value is the highest alarm level reached in the past one week based on data about the particular fire alarm system device. This ability allows a technician to search for all devices that had a peak value during this maintenance period using the mobile device.

These devices having peak values greater than a threshold value can be grouped together and presented to the technician via the mobile device. Based on this information, the fire alarm system devices of the group can each be diagnosed and adjustments to set points, programming, or other suitable adjustments can be made, or the fire alarm system device can be replaced.

In some embodiments, the system has the ability to quickly locate the particular fire alarm system device or a set of devices on a floor by asking the system to sound the nearest sounder (typically hardwired to a wall of a building) emitting an audible signal.

This feature enables the technician to quickly search for a fire alarm system device on a floor. If the floor has a huge coverage area and is new to the technician, it will be difficult for the technician to search for a particular fire alarm system device. Even where a physical identification signal is implemented, as discussed above, the technician needs to walk around the floor to see the fire alarm system devices that are responding by generating their physical identification signals. This may be tiring for a technician and will cost time, effort, and energy.

With this feature of the present disclosure, the technician will command the system by asking the sounder nearest to a particular fire alarm system device to be activated based on one or more criteria (e.g., circuit wiring layout of the system or cooperative detector settings, zone settings, etc.). So, when the nearest sounder is activated, it will become simpler for the technician to identify and reach the location of the particular fire alarm system device easily by hearing the sounder and moving toward that direction. Once the technician reaches the sounder, the technician can switch off the sounder, via the mobile device and look around to find the particular fire alarm system device that is responding with its physical identification signal.

Additionally, another function provided by the system includes the ability to test cooperative multi-detector sensors during commissioning time. Cooperative multi-detector sensing is the ability of a fire alarm system device such as a smoke detector to consider readings from nearby detectors in making alarm or pre-alarm decisions. Many buildings use this feature to minimize the number of false alarms in the building. However, during commissioning, testing this feature is a complex effort.

With the functionality of the present system, a technician can pick one or more fire alarm system devices to go into cooperative mode using the mobile device. The technician can create the configuration from the floor of the fire alarm system devices, via system functionality on the mobile device, rather than through physical access to the control panel, where in the technician would have to be on the floor of the control panel.

Using the mobile device, the technician can search for certain devices, by searching data within the database, for example, using user configurable device labels. Once the technician gets the filtered list, the technician can command all the fire alarm system devices on the list to go into a cooperative state. Once the technician is sure that the technician has gotten the correct list, the technician can put all of the listed devices into cooperative state, via the mobile monitoring application.

Once the rule to set the fire alarm system devices to cooperate is set, the technician can activate the first fire alarm system device and the corresponding cooperative fire alarm system devices to ensure cooperative rules are applied correctly. This can all be accomplished via the mobile device and at the location proximate to one or more of the listed fire alarm system devices, rather than from a location near the control panel.

Figure 2:
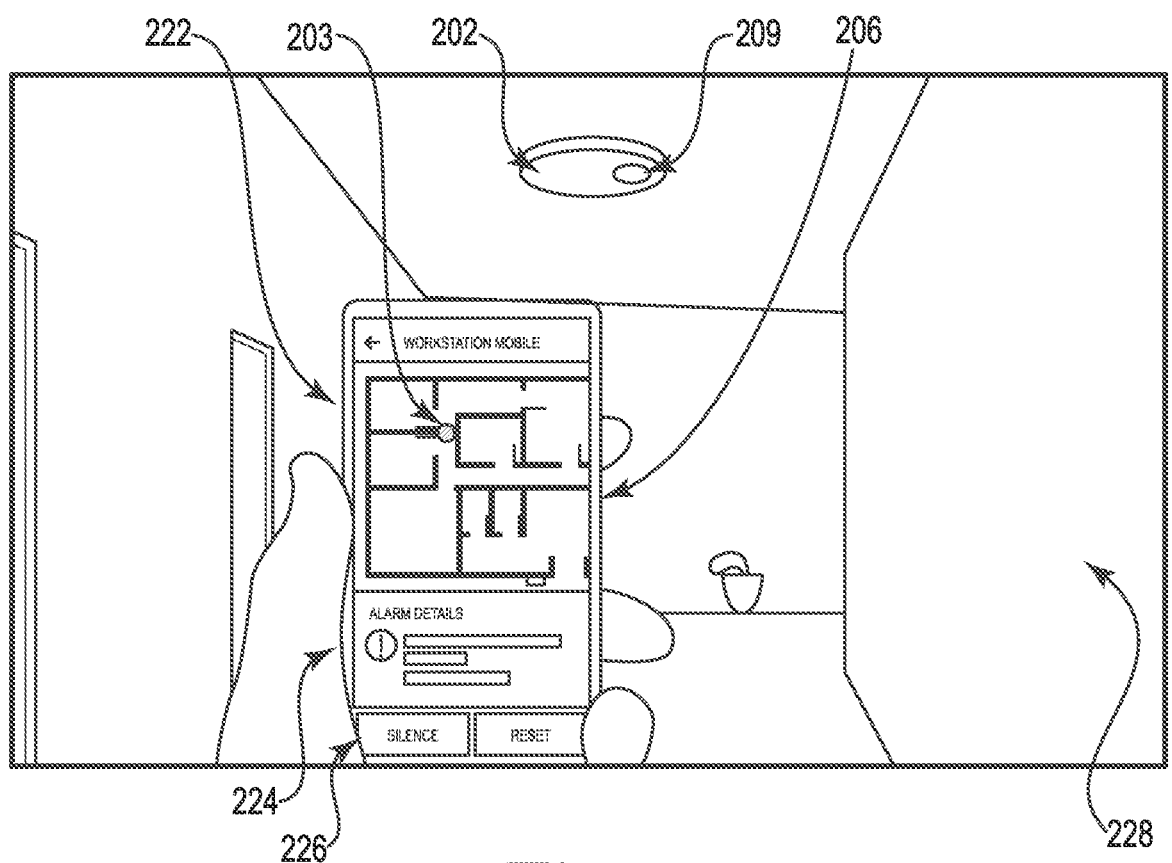
FIG. 2 illustrates a mobile device for use in a system for commission, inspection, and maintenance of a connected fire alarm system according to an embodiment of the present disclosure.

FIG. 2 illustrates a mobile device for use in a system for commission, inspection, and maintenance of a connected fire alarm system according to an embodiment of the present disclosure. As discussed above, the mobile device provides substantial unique functions to the fire alarm system in embodiments of the present disclosure.

FIG. 2 illustrates a graphical user interface (GUI) of a monitoring application on a mobile device. In this illustration, the mobile device 206 includes a number of functional buttons 226, some information 224 about the particular fire alarm system device the technician is being directed to, a schematic map 222 depicting the actual layout of the part of building 228 the technician is traversing, including the location of a fire alarm system device 202 depicted on the map at 203. The fire alarm system device 202 also includes an indicator 209 for generating a physical identification signal to help the technician identify the correct device needing maintenance.

The information provided at 224 can be any information helpful to the technician. For example, suitable information can be device identification number, model identifier, brand, maintenance history, upcoming maintenance from a maintenance schedule. The information can also include group, loop, or zone name and/or identifiers of other group, loop, or zone fire alarm system devices.

As discussed above, the interface can have a number of functional buttons 226 and can be configured to provide any function described herein that is attributed to the mobile device. For example, the two buttons shown in FIG. 2 provide a mechanism to silence a sounder, if a signal has been sent to sound the sounder as a guide to the technician or as part of a test procedure carried out by the technician. The other button is used to reset the status of the particular fire alarm system device on which maintenance is being performed, for example, once the testing/maintenance procedures have been accomplished.

Figure 3:
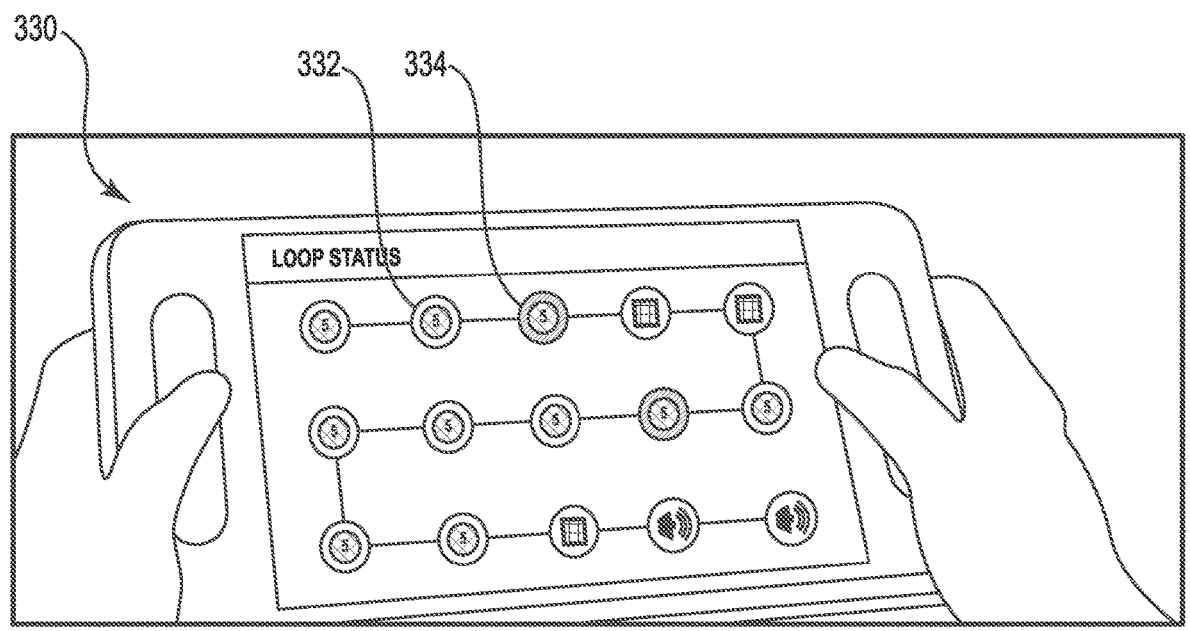
FIG. 3 illustrates another type of mobile device for use in a system for commission, inspection, and maintenance of a connected fire alarm system according to an embodiment of the present disclosure.

FIG. 3 illustrates another type of mobile device for use in a system for commission, inspection, and maintenance of a connected fire alarm system according to an embodiment of the present disclosure. In this example, a loop of fire alarm system devices is shown.

Each different icon presented on the GUI of the mobile device 330 represents a different fire alarm system device in the loop, which as indicated by the illustration is an interconnected group of devices. The different patterns on the icons represent different types of fire alarm system devices, such as smoke detectors, fire detectors, carbon dioxide detectors, audible alarm devices, user interaction devices such as pull switches, etc.

Further, some devices are indicated as not needing to be addressed for maintenance at 332 (e.g., outer ring of icon is not shaded) and others are indicated as needing to be examined for service issues at 334 (e.g., outer ring of icon shaded). In this manner, the technician can easily identify which devices are in a particular loop, which need attention and which don't, the type of devices in the loop, and their arrangement in the loop. This can be significantly helpful to a technician attempting to handle many maintenance or troubleshooting tasks with respect to the system.

Another functionality that can be provided by the system described in FIG. 1 provides the ability to give/update the fire alarm system device labels at the location of the particular fire alarm system device using his mobile device. One of the major challenges technicians face during commissioning and maintenance time is to ensure the right labels are given to each of the fire alarm system devices at the right locations. Without the solution of the present disclosure, two technicians are needed, one at the fire alarm system device location and the other at the panel location. In such a process, the first technician would activate the fire alarm system device and the second technician would be at the panel location to ensure a correct label is showing up on the panel. This process is complex and time consuming and prone to errors in communication between the technicians.

With this unique ability in the monitoring application, a single technician can also now command all the fire alarm system devices with a specific label to be activated at the same time. For example, the technician might search for all devices with label Conf Room ABC to respond, if the technician observes that a specific device is not responding in the conf room, the technician realizes that and fixes it, as the technician is located in the conference room with their mobile device rather than at the control panel which is not in the conference room and may, likely, not even be on the same floor as the conference room.

For example, one sample procedure for accomplishing this is as follows. The technician commands all of the fire alarm system devices in a particular area to provide a specific physical identification signal. The technician approaches a fire alarm system device that is not providing the specific physical identification signal, fixes the issue, and activates the fixed fire alarm system device.

The activation event appears on the GUI of the mobile device. The technician sees the label that the fire alarm system device has been assigned and will have an option to change the label at that time. As the reader can understand, such a process saves huge commissioning time, effort, and cost, among other benefits. The customized device labeling is discussed below in more detail with respect to FIG. 4.

Figure 4:
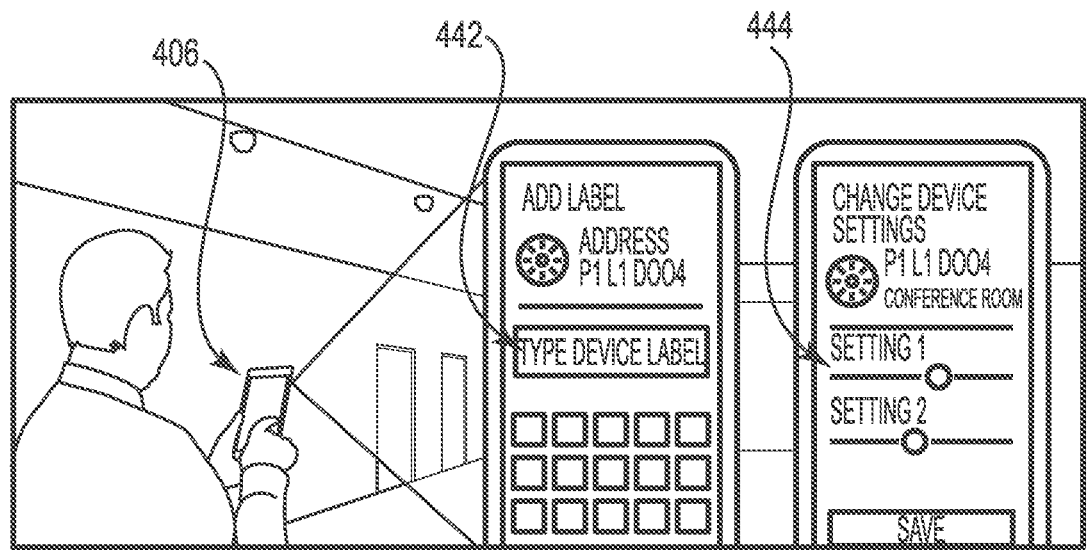
FIG. 4 illustrates user interface screens on a mobile device for use in a system for commission, inspection, and maintenance of a connected fire alarm system according to an embodiment of the present disclosure.

FIG. 4 illustrates user interface screens on a mobile device for use in a system for commission, inspection, and maintenance of a connected fire alarm system according to an embodiment of the present disclosure. As discussed herein, in some embodiments, the mobile monitoring application on mobile device 406 can have a functionality to allow the technician to customize the identification information of a particular fire alarm system device.

For example, as illustrated in FIG. 4, the functionality can allow for the customization of a device label at 442. For instance, a suitable label may be "conference room" as shown in the right depiction of the GUI in FIG. 4, wherein it provides the fire alarm system device address: P1L1D004 and the customized label: CONFERENCE ROOM.

The GUI can also provide functionality to change one or more fire alarm system device settings. For example, FIG. 4 at 444 illustrates two setting types being adjustable. Any suitable setting may be adjusted. For instance, a first alarm threshold and a second alarm threshold may be adjusted based, for example, on historical data regarding alarm triggering events for this particular fire alarm system device.

It should be noted that, since the changes discussed above are done from the mobile device to the database in the control panel, the changes can register on the system in near real time. This can be beneficial, for example, where multiple technicians may be moving around a building doing maintenance, as the system is up to date whenever they look at information about a particular fire alarm system device.

Figure 5:
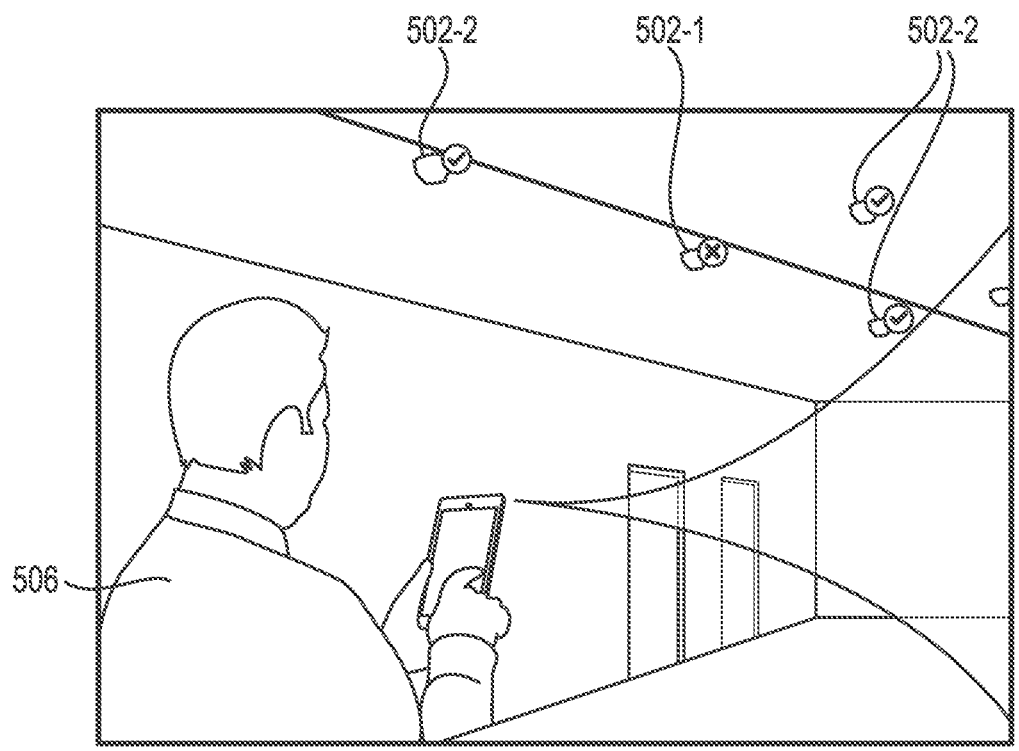
FIG. 5 illustrates multiple fire alarm system devices for use in the commission, inspection, and maintenance of a connected fire alarm system according to an embodiment of the present disclosure.

FIG. 5 illustrates multiple fire alarm system devices for use in the commission, inspection, and maintenance of a connected fire alarm system according to an embodiment of the present disclosure. As discussed above, in some embodiments, the fire alarm system devices can have different physical identification signals which help a technician identify those needing maintenance. In some embodiments, devices can even have different physical identification signals to identify different types of service needed. For example, if the embodiment of FIG. 5 had such a functionality, the fire alarm system device 502-1 may need a first type of maintenance performed on it, while devices 502-2 may need a different type of maintenance.

Further, in some embodiments, physical identification signals can be used to identify members of a specific group, loop, or zone. This can be helpful, for example, in determining if a device is part of the wrong group, loop, or zone. For example, in FIG. 5, device 502-1 has a different indicator than devices 502-2. In such an embodiment, if all devices shown were to be members of Zone 1 (indicated by the check mark in FIG. 5), this would indicate to the technician that device 502-1 is a member of a different zone and should be reassigned to Zone 1.

As can be understood by the reader, the embodiments of the present disclosure can provide a number of benefits. For example, embodiments can provide the: ability to search for a specific fire alarm system device on a floor using a mobile device, ability to securely search for a group of fire alarm system devices that are potentially due for maintenance or replacement, for example, based on the service history or general maintenance schedule, ability to quickly locate the fire alarm system device or a set of fire alarm system devices on a floor by asking the system to sound the nearest sounder based, for example, on the circuit diagram of the system or based on multi-criteria settings selected via the monitoring application located on a mobile device, ability to test cooperative multi-detector sensors during commissioning, and ability to give/update the fire alarm system device labels on the floor near the fire alarm system device using the mobile device, among other benefits.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion and not a restrictive one. Combination of the above embodiments, and other embodiments not specifically described herein, will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A fire alarm system in a building, comprising:
   a gateway connected to a system control panel for allowing mobile device access to the system;
   a mobile device used by a technician and connected to the control panel;
   a fire alarm system control application on the mobile device, wherein the fire alarm control system application gains access to the control panel via the gateway;
   a search utility in the fire alarm control system application for identifying a particular fire alarm system device that is in a specific condition or location;
   a database accessible via the fire alarm control system application wherein location and condition information about the plurality of fire alarm system devices is located, such that the search utility can search the database and identify the particular fire alarm system device from the other of the plurality of fire alarm system devices; and
   wherein the fire alarm system control application on the mobile device includes a schematic map depicting an actual layout of the part of building the technician is traversing, including a location of the particular fire alarm system device depicted on the map, and including an indicator for generating a physical identification signal to help the technician identify the correct device.

2. The fire alarm system of claim 1, wherein the database includes location information about a floor on which each of the plurality of fire alarm system devices is located and the fire alarm control system application search utility includes the ability to search the database and return results based on the location information.

3. The fire alarm system of claim 1, wherein the database includes zone information about a plurality of zones within the building each zone having multiple fire alarm system devices and into which each of the plurality of fire alarm system devices is a member of a zone of the plurality of zones and the fire alarm control system application search utility includes the ability to search the database and return results based on the zone information.

4. The fire alarm system of claim 1, wherein the database includes loop information about a plurality of loops within the building each loop having multiple fire alarm system devices and into which each of the plurality of fire alarm system devices is a member of a loop of the plurality of loops and the fire alarm control system application search utility includes the ability to search the database and return results based on the loop information.

5. The fire alarm system of claim 1, wherein the database includes group information about a plurality of groups within the building each group having multiple fire alarm system devices and into which each of the plurality of fire alarm system devices is a member of a group of the plurality of groups and the fire alarm control system application search utility includes the ability to search the database and return results based on the group information.

6. The fire alarm system of claim 1, wherein the database includes service history information for each fire alarm system device and the fire alarm control system application search utility includes the ability to search the database and return results based on the service history information.

7. The fire alarm system of claim 1, wherein the database includes suggested maintenance timeframe information for each fire alarm system device and the fire alarm control system application search utility includes
   the ability to search the database and return results based on the suggested maintenance timeframe information.

8. A method of identifying a particular fire alarm system device in a fire alarm system in a building, comprising:
   connecting a gateway to a system control panel for allowing mobile device access to the system;
   connecting a mobile device used by a technician to the control panel;
   opening a fire alarm system control application on the mobile device;
   gaining access to the control panel via the gateway;
   identifying a particular fire alarm system device that is in a specific condition or location and wherein the particular fire alarm system device is identified from a plurality of fire alarm system devices; and
   wherein the fire alarm system control application on the mobile device includes a schematic map depicting an actual layout of the part of building the technician is traversing, including a location of the particular fire alarm system device depicted on the map, and including an indicator for generating a physical identification signal to help the technician identify the correct device.

9. The method of claim 8, wherein the specific condition is a maintenance condition wherein service is needed.

10. The method of claim 8, wherein the specific condition is membership of the particular fire alarm system device in a group of devices defined within the plurality of fire alarm system devices.

11. The method of claim 8, wherein the specific location is wherein the particular fire alarm system device is located in a group of devices at a particular location in a building.

12. The method of claim 8, wherein the specific location is wherein the particular fire alarm system device is located in a group of devices on a particular floor in a building.

13. The method of claim 8, wherein the specific location is wherein the particular fire alarm system device is located in a group of devices on a particular loop in a building.

14. The method of claim 8, wherein the method includes identifying a particular fire alarm system device that is in a specific condition and location and wherein the particular fire alarm system device is identified from a plurality of fire alarm system devices having different conditions or locations.

15. The method of claim 8, wherein the method further includes commanding the particular fire alarm system device, via the mobile application to sound an audible signal by activating a nearest sounder to the particular fire alarm system device that identifies to a technician where the particular fire alarm system device is located in the building.

16. A method of identifying a particular fire alarm system device in a fire alarm system in a building, comprising:
   connecting a gateway to a system control panel for allowing mobile device access to the system;
   connecting a mobile device used by a technician to the control panel;
   opening a fire alarm system control application on the mobile device;
   gaining access to the control panel via the gateway;
   identifying a particular fire alarm system device that is in a specific condition or location and wherein the particular fire alarm system device is identified from a plurality of fire alarm system devices;
   commanding the particular fire alarm system device, via the mobile application to show a physical identification signal by activating a visual indicator, viewable by a technician, on the particular fire alarm system device that differentiates the particular fire alarm system device from other of the plurality of fire alarm system devices; and
   wherein the fire alarm system control application on the mobile device includes a schematic map depicting an actual layout of the part of building the technician is traversing, including a location of the particular fire alarm system device depicted on the map, and including an indicator for generating a physical identification signal to help the technician identify the correct device.

17. The method of claim 16, wherein the visual indicator is a light located on the particular alarm system device.

18. The method of claim 17, wherein the visual indicator can provide at least two different indications.

19. The method of claim 17, wherein identifying a particular fire alarm system device that is in a specific condition or location includes identifying multiple particular fire alarm system devices that are in the same specific condition or location and wherein the multiple particular fire alarm system devices are identified from a plurality of fire alarm system devices.

20. The method of claim 19, wherein commanding the particular fire alarm system device includes commanding at least one of the particular fire alarm system devices, via the mobile application to show a physical identification signal by activating a visual indicator, viewable by a technician, on the commanded particular fire alarm system device that differentiates the particular fire alarm system device from other of the plurality of fire alarm system devices.

* * * * *